United States Patent
Lee et al.

(10) Patent No.: US 12,551,115 B2
(45) Date of Patent: Feb. 17, 2026

(54) SELF-TRAINING SYSTEM FOR LOWERING BLOOD PRESSURE AND RELIEVING PHYSIOLOGICAL AND PSYCHOLOGICAL STRESS

(71) Applicant: METABRAIN TECHNOLOGY PTE. LTD., Singapore (SG)

(72) Inventors: Shin-Da Lee, Taichung (TW); Wen-Fang Lei, Taoyuan (TW)

(73) Assignees: METABRAIN TECHNOLOGY PTE. LTD., Singapore (SG); ZHUHAI ULOOK METABRAIN MEDICAL TECHNOLOGY CO., LTD., Zhuhai (CN)

( * ) Notice: Subject to any disclaimer, the term of this patent is extended or adjusted under 35 U.S.C. 154(b) by 539 days.

(21) Appl. No.: 18/116,517

(22) Filed: Mar. 2, 2023

(65) Prior Publication Data

US 2023/0277070 A1    Sep. 7, 2023

(30) Foreign Application Priority Data

Mar. 3, 2022 (TW) ................................. 111107808

(51) Int. Cl.
*A61B 5/0205* (2006.01)
*A61B 5/00* (2006.01)
(Continued)

(52) U.S. Cl.
CPC ........ *A61B 5/0205* (2013.01); *A61B 5/02108* (2013.01); *A61B 5/02444* (2013.01);
(Continued)

(58) Field of Classification Search
CPC .............. A61B 5/0205; A61B 5/02108; A61B 5/02444; A61B 5/0816; A61B 5/1135;
(Continued)

(56) References Cited

U.S. PATENT DOCUMENTS 10,345,593 B2 *  7/2019  Samec ................. A61B 3/1005
10,841,724 B1 *  11/2020  Tran ........................ G06F 3/013
(Continued)

FOREIGN PATENT DOCUMENTS

TW        1631933 B  *  8/2018
WO    WO-2014138925 A1 *  9/2014 ............. G16H 40/67

*Primary Examiner* — Jeffrey G. Hoekstra
(74) *Attorney, Agent, or Firm* — MUNCY, GEISSLER, OLDS & LOWE, P.C.

(57) ABSTRACT

A self-training system is provided, including: a respiration measurement unit, a blood oxygen measurement unit, a blood pressure measurement unit, an electrode unit, an audio stimulation unit, a display unit and a control unit. The display unit displays a virtual image including a plurality of display areas when the display unit is in a normal mode. Said display areas respectively correspond to a pulse transit time data, a brainwave signal, a heart rate variability data, a breathing signal, a heart rate data, a blood pressure data and a blood oxygen saturation signal. The control unit controls the said display areas to display respective real-time display charts according to respective signals and data, and controls the audio stimulation unit to play a binaural beats with frequency following response so that the user can receive stimulations and guidance to lower blood pressure and relieve physiological and psychological stress.

6 Claims, 8 Drawing Sheets

(51) Int. Cl.
  *A61B 5/021* (2006.01)
  *A61B 5/024* (2006.01)
  *A61B 5/08* (2006.01)
  *A61B 5/113* (2006.01)
  *A61B 5/291* (2021.01)
(52) U.S. Cl.
  CPC .......... *A61B 5/0816* (2013.01); *A61B 5/1135* (2013.01); *A61B 5/291* (2021.01); *A61B 5/7278* (2013.01); *A61B 5/7425* (2013.01)
(58) Field of Classification Search
  CPC ..... A61B 5/291; A61B 5/7278; A61B 5/7425; A61B 5/021; A61B 5/02405; A61B 5/02438; A61B 5/165; A61B 5/318; A61B 5/369; A61B 5/374; A61B 5/375; A61B 5/38; A61B 5/4836; A61B 5/486; A61B 5/742; A61B 5/6803
  See application file for complete search history.

(56) References Cited

U.S. PATENT DOCUMENTS

| | | | |
|---|---|---|---|
| 10,885,800 B2* | 1/2021 | Causevic | G16H 20/30 |
| 10,943,407 B1* | 3/2021 | Morgan | G16H 15/00 |
| 2017/0039045 A1* | 2/2017 | Abrahami | A61B 5/486 |
| 2017/0293356 A1* | 10/2017 | Khaderi | A61B 3/113 |
| 2017/0365101 A1* | 12/2017 | Samec | A61B 5/163 |
| 2019/0387998 A1* | 12/2019 | Garten | A61M 21/00 |
| 2021/0169417 A1* | 6/2021 | Burton | A61B 5/4857 |

* cited by examiner

SELF-TRAINING SYSTEM FOR LOWERING BLOOD PRESSURE AND RELIEVING PHYSIOLOGICAL AND PSYCHOLOGICAL STRESS

BACKGROUND OF THE INVENTION

Field of the Invention

The present invention relates to a self-training system for lowering blood pressure and relieving physiological and psychological stress.

Description of the Prior Art

Generally, hypertensive patients usually control their blood pressure by taking drugs, or another way for the hypertensive patients to control blood pressure is to exercise. However, the hypertensive patients without exercise habits has low willingness to exercise, therefore, it is necessary to develop an equipment that improves the willingness to exercise in the hypertensive patients.

The present invention is, therefore, arisen to obviate or at least mitigate the above-mentioned disadvantages.

SUMMARY OF THE INVENTION

The main object of the present invention is to provide a self-training system for lowering blood pressure and relieving physiological and psychological stress to overcome the above-mentioned disadvantages.

To achieve the above and other objects, the present invention provides a self-training system for lowering blood pressure and relieving physiological and psychological stress, configured to be used by a user, including: a respiration measurement unit, a blood oxygen measurement unit, a blood pressure measurement unit, a head frame unit, an electrode unit, an audio stimulation unit, a display unit and a control unit.

The respiration measurement unit includes a breathing strap configured to be wrapped around a chest of the user, a breathing sensor disposed on the breathing strap and configured to measure a state of chest expansion of the user and output a breathing signal accordingly, and a heartbeat sensor disposed on the breathing strap and configured to measure a heartbeat status of the user and output a heartbeat signal accordingly. The blood oxygen measurement unit includes a finger cot configured to be worn on a finger of the user, a blood oxygen sensor disposed on the finger cot and configured to measure a blood oxygen saturation level of the user and output a blood oxygen saturation signal, and a finger pulse sensor disposed on the finger cot and configured to measure a change status of a blood vessel volume of the user and output a finger pulse signal accordingly. The blood pressure measurement unit is configured to be worn by the user for measuring a blood pressure status of the user and outputting a blood pressure signal accordingly. The head frame unit corresponds to a head shape of the user and includes two ear portions corresponding to ears of the user and a top-side portion connected between the two ear portions and configured to be disposed across a top of a head of the user upwardly. The electrode unit includes a plurality of electrode agents disposed on the head frame unit, and two of the plurality of electrode agents are disposed on the top-side portion and respectively correspond to a C3 position and a C4 position of an international 10-20 system for electroencephalograph (EEG) electrode placement to measure a brainwave status of the user and output a brainwave signal accordingly. The audio stimulation unit includes pair of headphones disposed on the two ear portions, and the display unit is disposed on the head frame unit and displays a virtual image to the user. The display unit is switchable between a normal mode and a guided training mode. In the normal mode, the virtual image includes a plurality of display areas; one of the plurality of display areas corresponds to a pulse transit time data; one of the plurality of display areas corresponds to the brainwave signal; one of the plurality of display areas corresponds to a heart rate variability data; one of the plurality of display areas corresponds to the breathing signal; one of the plurality of display areas corresponds to a heart rate data; one of the plurality of display areas corresponds to a blood pressure data; and one of the plurality of display areas corresponds to the blood oxygen saturation signal. Each of the plurality of display areas has a real-time display chart, a high level indicator light and a low level indicator light. In the guided training mode, the virtual image displays a guided training video. The control unit is communicatively connected with the breathing sensor, the heartbeat sensor, the blood oxygen sensor, the finger pulse sensor, the blood pressure measurement unit, the plurality of electrode agents, the pair of headphones and the display unit. The control unit calculates the pulse transit time data corresponding to a pulse transit time according to the heartbeat signal and the finger pulse signal, calculates the heart rate variability data corresponding to a heart rate variability according to the heartbeat signal, calculates the heart rate data corresponding to a heart rate according to the heartbeat signal, and calculates the blood pressure data corresponding to a blood pressure according to the blood pressure signal. When the display unit is in the normal mode, the control unit controls the plurality of display areas to display said real-time display charts according to said signals and said data. When one of the said signals and the said data is greater than a highest predetermined value, the control unit controls corresponding one of said high level indicator lights to light up. When one of the said signals and the said data is lower than a lowest predetermined value, the control unit controls corresponding one of said low level indicator lights to light up. When the display unit is in the guided training mode, the control unit controls the display unit to display the guided training video and controls the pair of headphones to display a guiding voice corresponding to the guided training video. When the control unit performs a sound wave-induced brain stimulation, the control unit controls the pair of headphones to display a binaural beats with frequency following response and stop after a predetermined period of time. The binaural beats with frequency following response have a major carry sound and a loading sound having a frequency difference of binaural beats therebetween, and the pair of headphones displays the major carry sound and the loading sound simultaneously. In the predetermined period of time, the binaural beats with frequency following response are gradually decreased from a higher frequency difference of binaural beats to a low frequency difference of binaural beats, the high frequency difference of binaural beats is between 45 Hz and 35 Hz, and the low frequency difference of binaural beats is between 5 Hz and 1 Hz.

The advantage of the present invention is that: with the breathing sensor, the heartbeat sensor, the blood oxygen sensor, the finger pulse sensor, the blood pressure measurement unit, the plurality of electrode agents, the pair of headphones and the display unit, the user can receive stimulations and guidance to lower blood pressure and relieve physiological and psychological stress.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
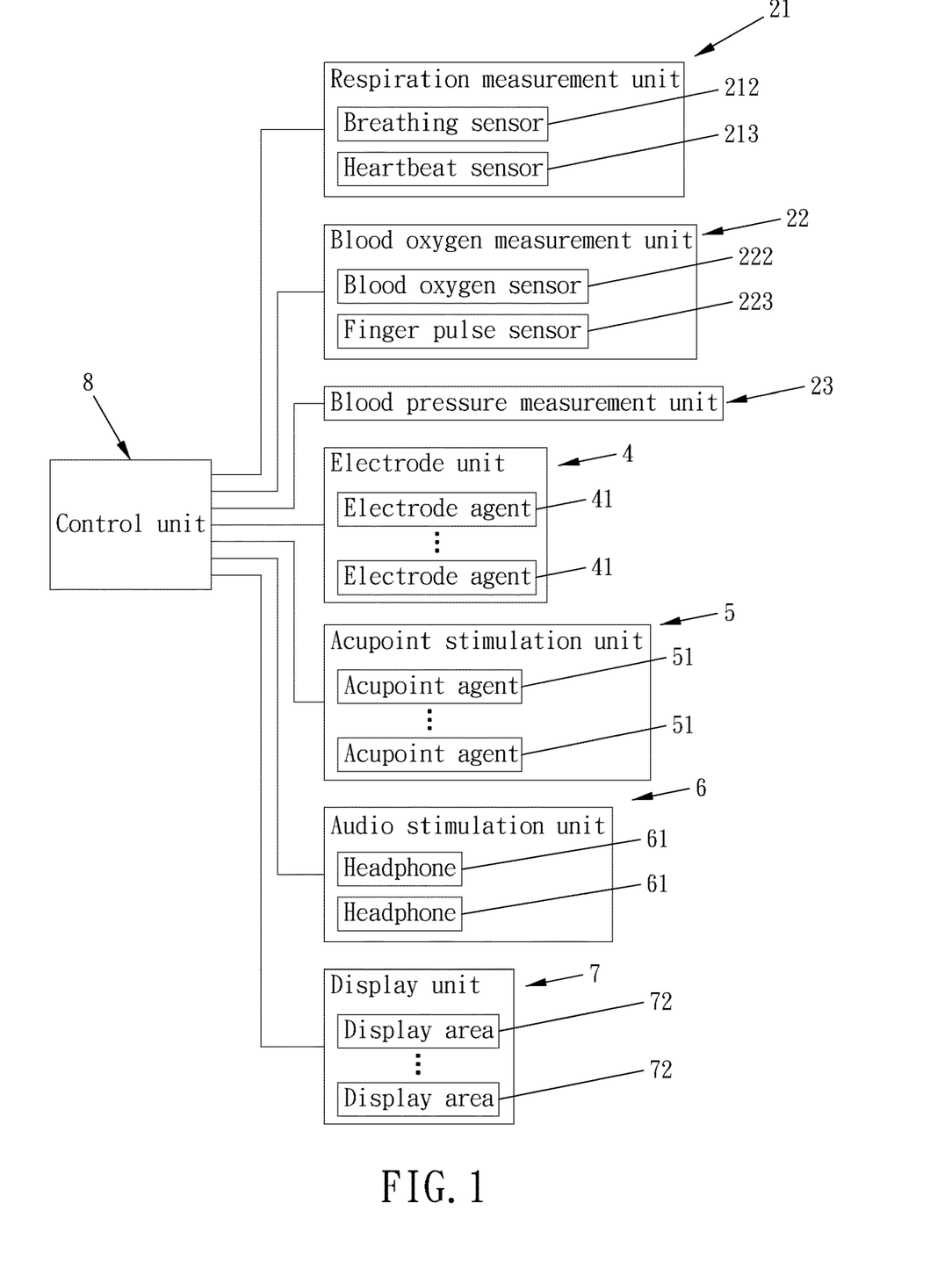
FIG. 1 is a block diagram of a preferable embodiment of the present invention.
Figure 2:
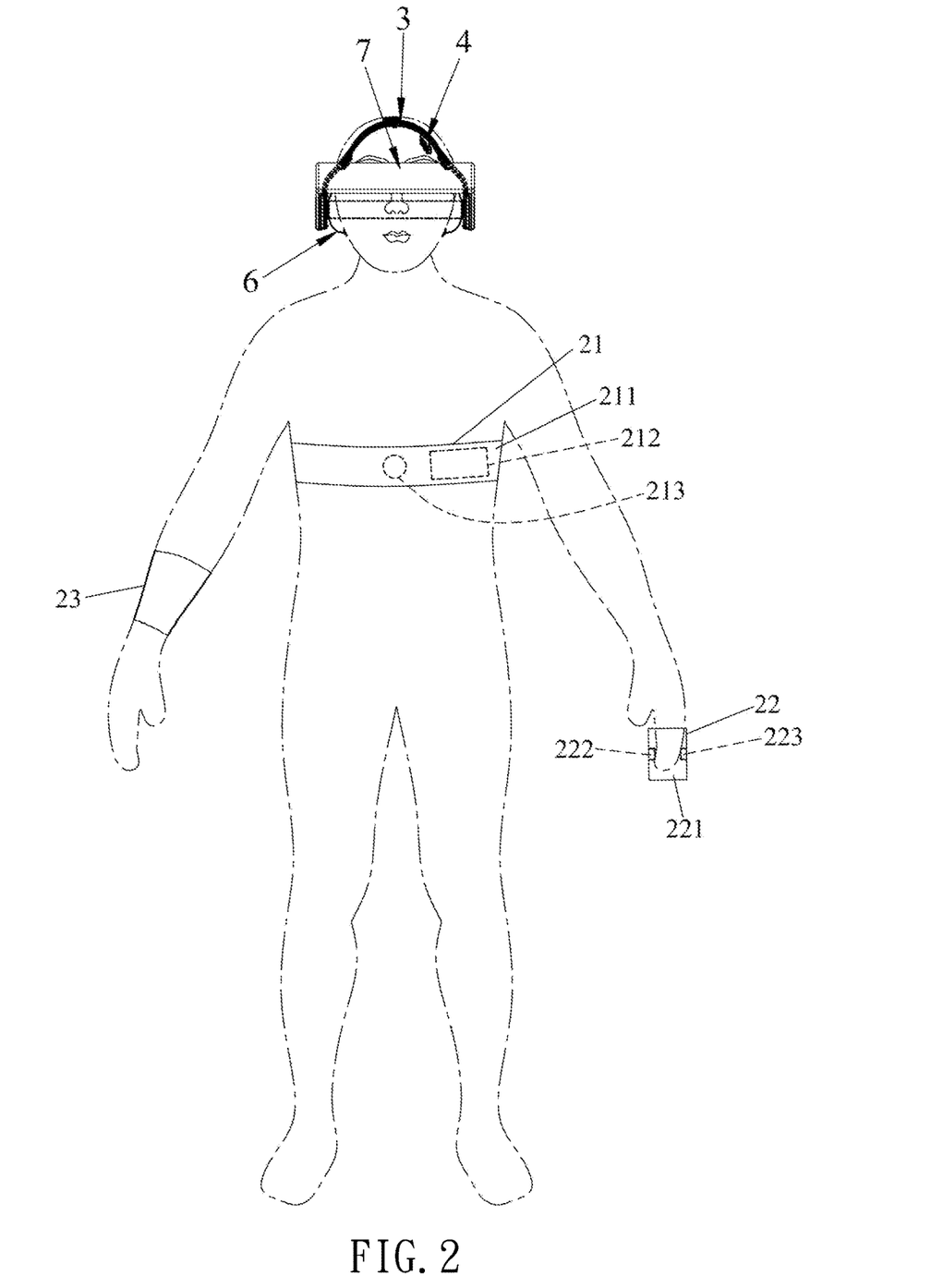
FIG. 2 is a partial front view of a preferable embodiment of the present invention.
Figure 3:
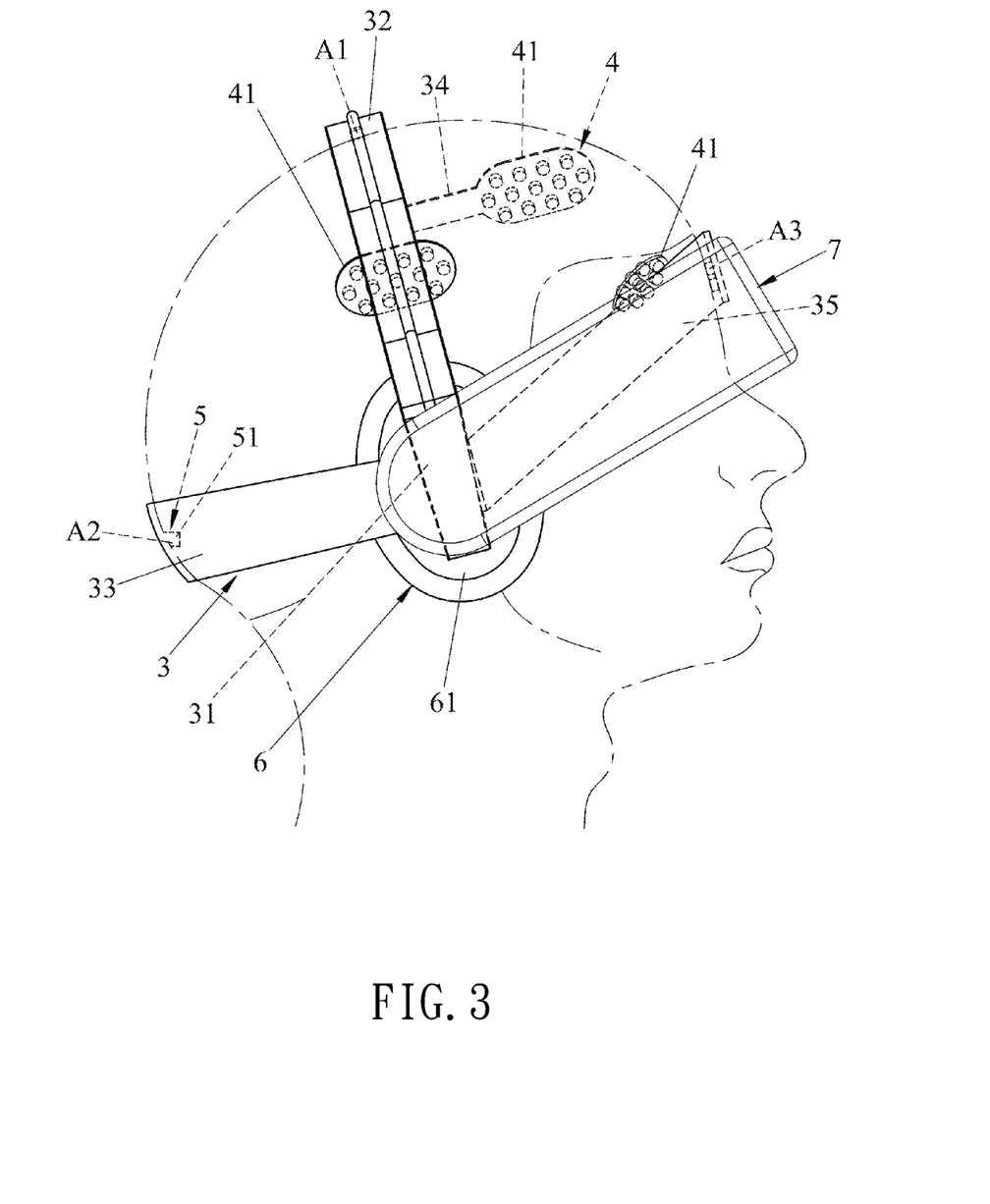
FIG. 3 is a side view showing a head frame unit, an electrode unit, an acupoint stimulation unit, an audio stimulation unit and a display unit according to a preferable embodiment of the present invention.

Please refer to FIGS. 1 to 3 for a preferable embodiment of the present invention. A self-training system for lowering blood pressure and relieving physiological and psychological stress of the present invention is configured to be used by a user. The self-training system for lowering blood pressure and relieving physiological and psychological stress includes a respiration measurement unit 21, a blood oxygen measurement unit 22, a blood pressure measurement unit 23, a head frame unit 3, an electrode unit 4, an acupoint stimulation unit 5, an audio stimulation unit 6, a display unit 7 and a control unit 8.

The respiration measurement unit 21 includes a breathing strap 211 configured to be wrapped around a chest of the user, a breathing sensor 212 disposed on the breathing strap 211 and configured to measure a state of chest expansion of the user and output a breathing signal accordingly, and a heartbeat sensor 213 disposed on the breathing strap 211 and configured to measure a heartbeat status of the user and output a heartbeat signal accordingly. In this embodiment, the breathing sensor 212 measures a pulling force of the breathing strap 211 generated by breathing, and the heartbeat signal is an ECG signal.

The blood oxygen measurement unit 22 includes a finger cot 221 configured to be worn on a finger of the user, a blood oxygen sensor 222 disposed on the finger cot 221 and configured to measure a blood oxygen saturation level of the user and output a blood oxygen saturation signal accordingly, and a finger pulse sensor 223 disposed on the finger cot 221 and configured to measure a change status of a blood vessel volume of the user and output a finger pulse signal accordingly.

The blood pressure measurement unit 23 is configured to be worn by the user for measuring a blood pressure status of the user and outputting a blood pressure signal accordingly.

Figure 4:
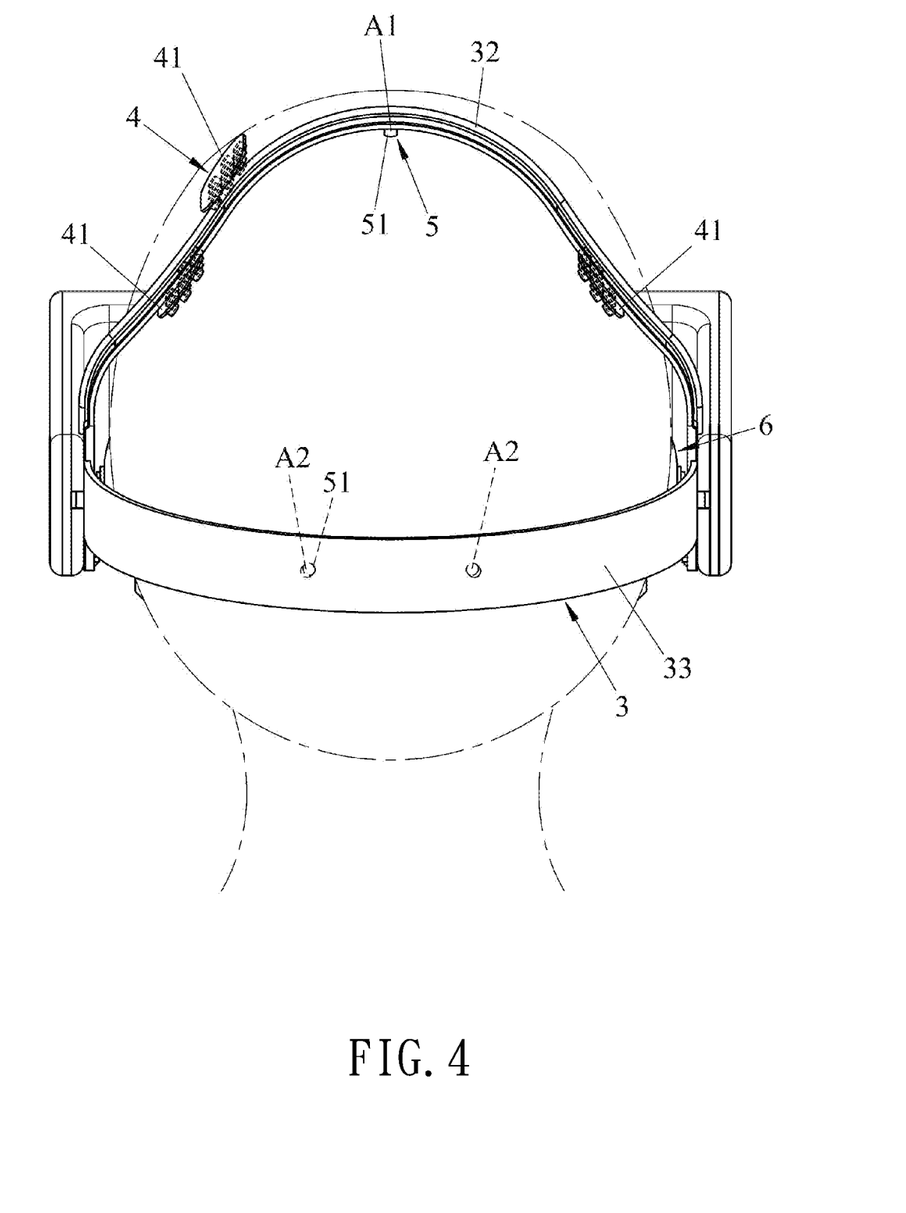
FIG. 4 is a rear view showing the head frame unit, the electrode unit, the acupoint stimulation unit, the audio stimulation unit and the display unit according to a preferable embodiment of the present invention.
Figure 5:
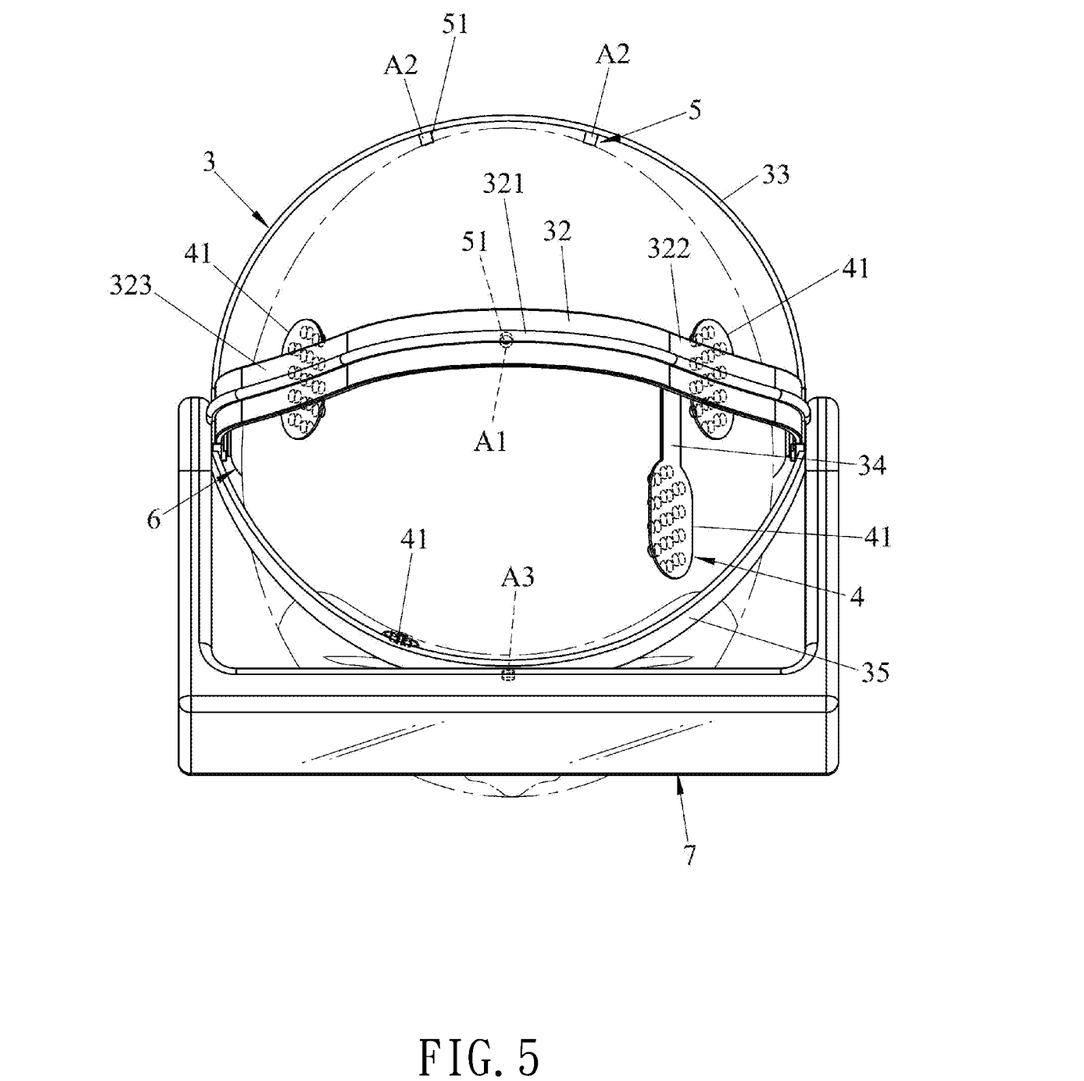
FIG. 5 is a top view showing the head frame unit, the electrode unit, the acupoint stimulation unit, the audio stimulation unit and the display unit according to a preferable embodiment of the present invention.

Please refer to FIGS. 3, 4 and 5, the head frame unit 3 corresponds to a head shape of the user and includes two ear portions 31 corresponding to ears of the user, a top-side portion 32 connected between the two ear portions 31 and configured to be disposed across a top of a head of the user upwardly, a rear-side portion 33 connected between the two ear portions 31 and configured to be disposed across a back of the head of the user, a connecting portion 34 extending forwardly from the top-side portion 32, and a front-side portion 35 connected between the two ear portions 31 and configured to be disposed across a forehead of the user. The top-side portion 32 includes a top area 321 located in a center between the two ear portions 31, and a left area 322 and a right area 323 respectively connected between one of the two ear portions 31 and the top area 321, and the connecting portion 34 extending forwardly from the left area 322.

Figure 7:
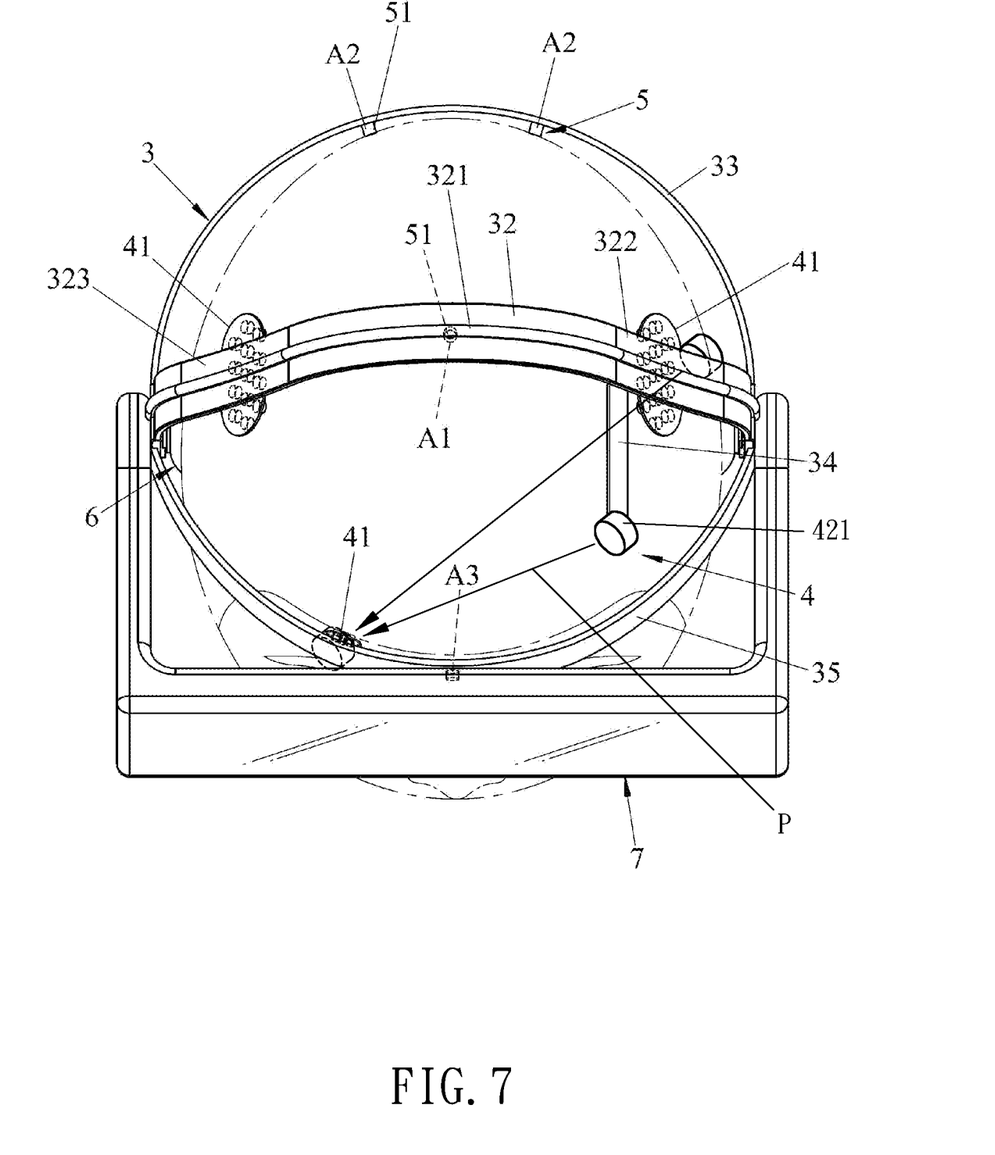
FIG. 7 is a schematic diagram showing an electromagnetic pulse generated by a Helmholtz coil according to another preferable embodiment of the present invention.
Figure 8:
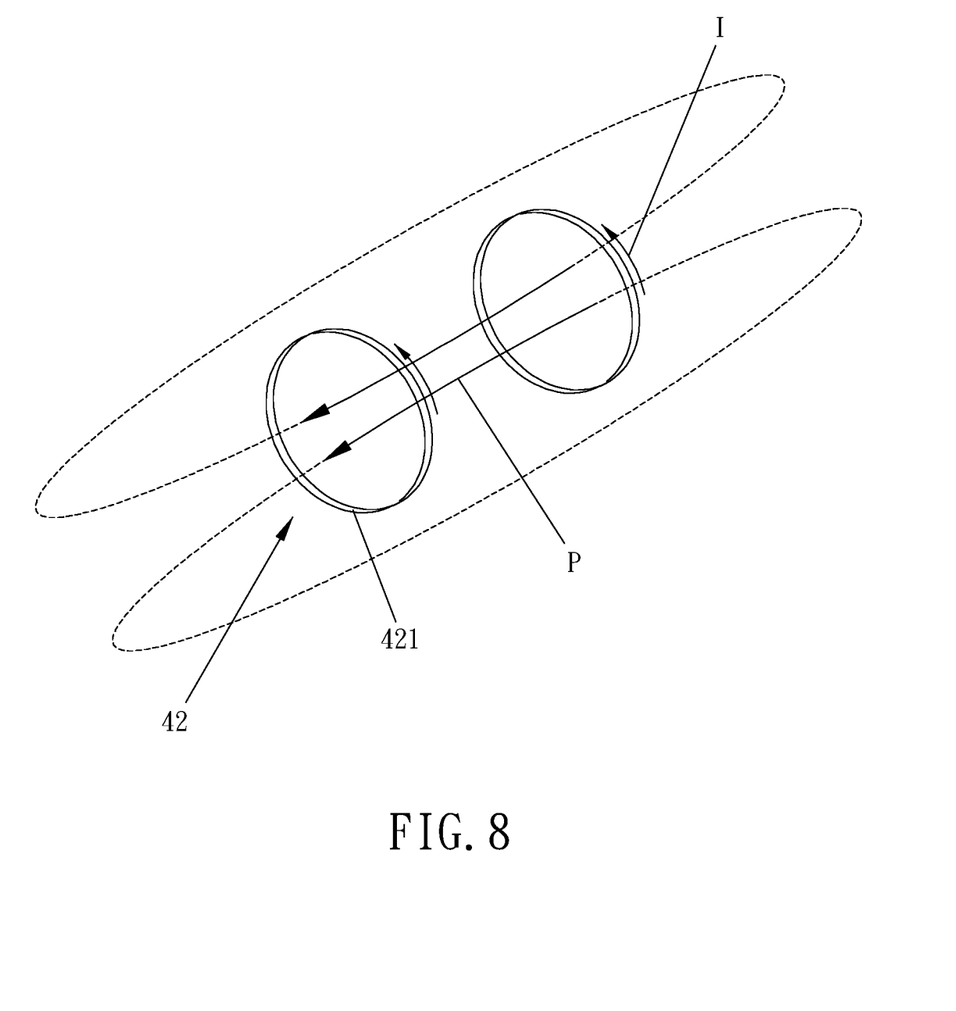
FIG. 8 is a schematic diagram showing the electromagnetic pulse generated between a pair of electromagnets of FIG. 7.

The electrode unit 4 includes a plurality of electrode agents 41 disposed on the head frame unit 3, and two of the plurality of electrode agents 41 are disposed on the left area 322 and the right area 323 of the top-side portion 32 and respectively correspond to a C3 position and a C4 position of an international 10-20 system for electroencephalograph (EEG) electrode placement to measure a brainwave status of the user and output a brainwave signal accordingly. Two of the plurality of electrode agents 41 are respectively disposed on the connecting portion 34 and the front-side portion 35 and respectively correspond to a F3 position and a SO position in the international 10-20 system for EEG electrode placement. Said electrode agent 41 corresponding to the C3 position is configured to measure the brainwave status of the user, and said electrode agents 41 corresponding to the F3 position and the SO position are controlled to output physical stimulations including one of a current for transcranial electrical stimulation and an electromagnetic pulse for transcranial magnetic stimulation to the head of the user. In this embodiment, the brainwave signal is a EEG signal; when the plurality of electrode agents 41 are of a type outputting direct current, a current intensity of the current is between 1 mA and 2 mA, a current density of the current is between 0.03 mA/cm$^2$ and 0.09 mA/cm$^2$; when the plurality of electrode agents 41 are of a type outputting the electromagnetic pulse, an electromagnetic frequency of the electromagnetic pulses is 1 Hz. In another embodiment (as shown in FIGS. 7-8), the electromagnetic pulse P may be generated by a Helmholtz coil 42 consisting of a pair of electromagnets 421 arranged on the same axis, carrying an equal electric current I in the same direction. The electromagnetic pulse P may be generated by the Helmholtz coil 42 and between the C3 position and the SO position and between the F3 position and the SO position.

The acupoint stimulation unit 5 includes four acupoint agents 51 disposed on the head frame unit 3, and the four acupoint agents 51 are controllable to output physical stimulations and configured to output physical stimulations of laser lights to acupoints on the head of the user. One of the four acupoint agents 51 is configured to be selectively disposed on a center of the top area 321 and correspond to a baihui acupoint of the user (annotated as A1 in the figures). Two of the four acupoint agents 51 are configured to be selectively disposed on the rear-side portion 33 and located at positions that 7 times of a finger cun backward from the center of the top area 321 and 2.25 times of the finger cun spaced apart from the two ear portions 31 corresponding respectively to two fengchi acupoints of the user (annotated as A2 in the figures). One of the four acupoint agents 51 is configured to be selectively disposed on the front-side portion 35 and located at a position that 10 times of the finger cun forward from the top area 321 corresponding to a yintang acupoint of the user (annotated as A3 in the figures). The finger cun is substantially 2.3 cm, and wavelengths of the laser lights of the four acupoint agents 51 are between 500 nm and 900 nm.

The audio stimulation unit 6 includes a pair of headphones 61 disposed on the two ear portions 31.

Figure 6:
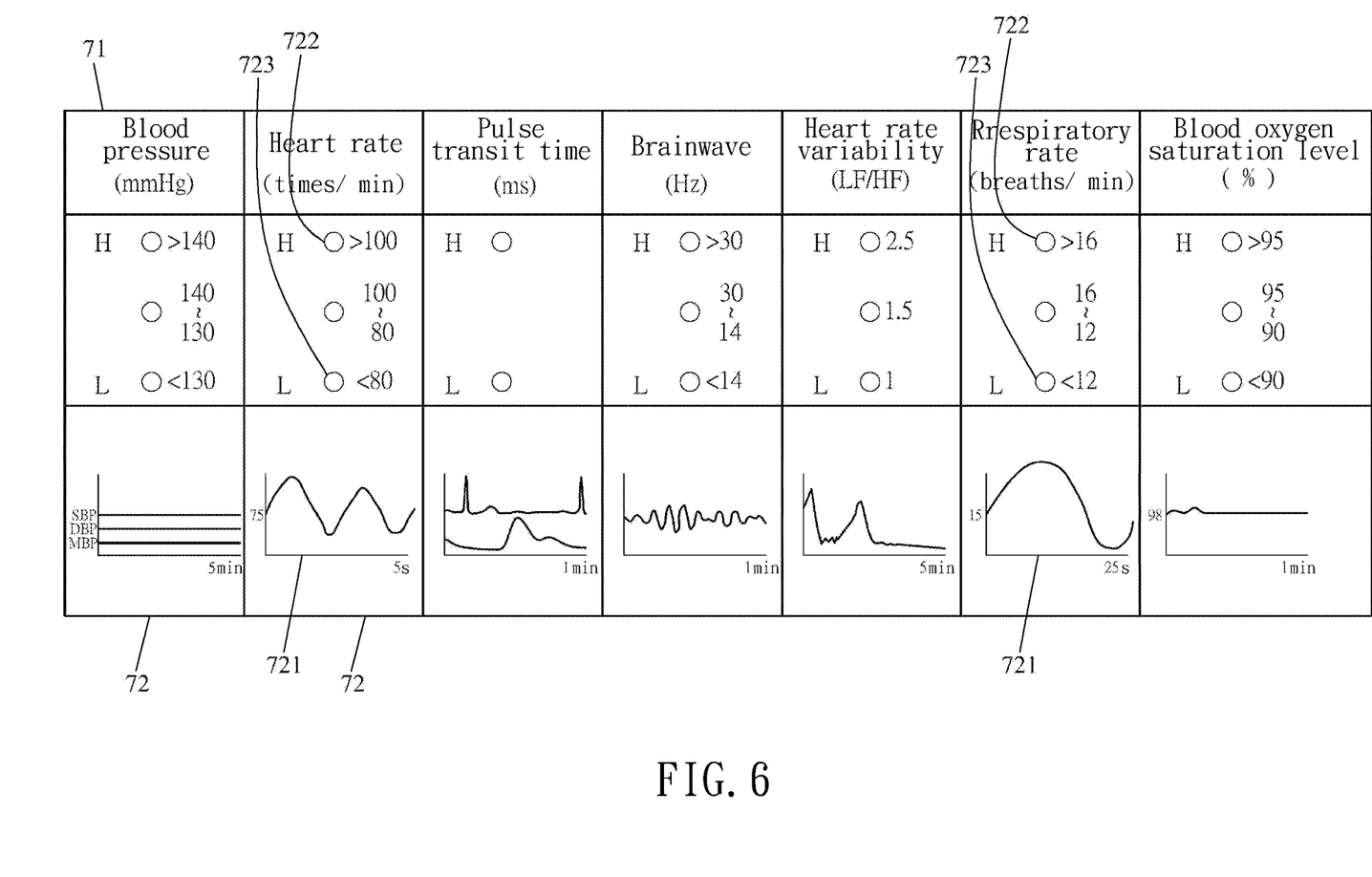
FIG. 6 is a schematic diagram of a preferable embodiment of the present invention when the display unit is in a normal mode.

Please refer to FIGS. 1, 3 and 6, the display unit 7 is disposed on the head frame unit 3 and displays a virtual image 71 to the user.

The display unit 7 is switchable between a normal mode and a guided training mode. In the normal mode, the virtual image 71 includes a plurality of display areas 72, one of the plurality of display areas 72 corresponds to a pulse transit time data, one of the plurality of display areas 72 corresponds to the brainwave signal, one of the plurality of display areas corresponds to a heart rate variability data, one of the plurality of display areas 72 corresponds to the breathing signal, one of the plurality of display areas 72 corresponds to a heart rate data, one of the plurality of display areas 72 corresponds to a blood pressure data, and one of the plurality of display areas 72 corresponds to the blood oxygen saturation signal. Each of the plurality of display areas 72 has a real-time display chart 721, a high level indicator light 722, and a low level indicator light 723.

In the guided training mode, the virtual image 71 displays a guided training video (not shown in the figures), and a content of the guided training video is to guide the user to diaphragmatic deep breath for decreasing physiological and psychological stress and to stretch the user's neck toward flexion, extension, and sidebending to decrease blood pressure via activating user's baroreflex.

The control unit 8 is communicatively connected with the breathing sensor 212, the heartbeat sensor 213, the blood oxygen sensor 222, the finger pulse sensor 223, the blood pressure measurement unit 23, the plurality of electrode agents 41, the four acupoint agents 51, the pair of headphones 61 and the display unit 7. The control unit 8 controls the plurality of electrode agents 41 and the four acupoint agents 51 to output the physical stimulations.

The control unit 8 calculates the pulse transit time data (PTT) corresponding to a pulse transit time according to the heartbeat signal and the finger pulse signal, calculates the heart rate variability data corresponding to a heart rate variability (HRV) according to the heartbeat signal, calculates the heart rate data corresponding to a heart rate (HR) according to the heartbeat signal, and calculates the blood pressure data corresponding to a blood pressure according to the blood pressure signal. In this embodiment, the pulse transit time data is the time taken for an arterial pulse to travel from the wave generated by heart beating, the blood pressure data includes systolic blood pressure (SBP), diastolic blood pressure (DBP) and mean arterial pressure (MBP).

When the display unit 7 is in the normal mode, the control unit 8 controls the plurality of display areas 72 to display said real-time display chart 721 according to said signals and said data. When one of the said signals and the said data is greater than a highest predetermined value, the control unit 8 controls corresponding one of said high level indicator lights 722 to light up. When one of the said signals and the said data is lower than a lowest predetermined value, the control unit 8 controls corresponding one of said low level indicator lights 723 to light up.

Take the display areas 72 corresponding to the brainwave signal as an example, corresponding one of said real-time display charts 721 may show the brainwave signal within 1 minute. When a frequency of the brainwave signal is higher than 30 Hz, corresponding one of said high level indicator light 722 lights up; and when the frequency of the brainwave signal is lower than 14 Hz, corresponding one of said low level indicator light 723 lights up.

Take the display areas 72 corresponding to the heart rate as another example, corresponding one of said real-time display charts 721 may show the heartbeat signal within 5 seconds. When a frequency of the heartbeat signal is higher than 100 times per minute, corresponding one of said high level indicator light 722 lights up; and when the frequency of the heartbeat signal is lower than 80 times per minute, corresponding one of said low level indicator light 723 lights up.

When the display unit 7 is in the guided training mode, the control unit 8 controls the display unit 7 to display the guided training video and controls the pair of headphones 61 to display a guiding voice corresponding to the guided training video. In this embodiment, when the control unit 8 controls the pair of headphones 61 to display the guiding voice corresponding to the guided training video, the guiding voice is configured to guide the user to gradually reduce a respiratory rate from 22~18 breaths per minute to 12~8 breaths per minute.

The control unit 8 can perform a sound wave-induced brain stimulation. When the control unit 8 performs the sound wave-induced brain stimulation, the control unit 8 controls the pair of headphones 61 to display binaural beats with frequency following response and stop after a predetermined period of time. The binaural beats with frequency following response have a major carry sound and a loading sound having a frequency difference of binaural beats therebetween, and the pair of headphones 61 display the major carry sound and the loading sound simultaneously. In the predetermined period of time, the binaural beats with frequency following response are gradually decreased from a higher frequency difference of binaural beats to a lower frequency difference of binaural beats, the higher frequency difference of binaural beats is between 45 Hz and 35 Hz, and the lower frequency difference of binaural beats is between 5 Hz and 1 Hz.

Please refer to FIGS. 1, 2 and 6, in operation, the user wears the breathing strap 211, the finger cot 221, the blood pressure measurement unit 23 and the head frame unit 3. After that, the control unit 8 controls the plurality of electrode agents 41 and the four acupoint agents 51 to output the physical stimulations, and the control unit 8 performs the sound wave-induced brain stimulation to display the binaural beats with frequency following response. Then, the display unit 7 is switched to the guided training mode, the user slows down breathing under the guidance of the guided training video and the guiding voice. Last, the control unit 8 controls the display unit 7 to be switched to the normal mode so that the user can see current physiological data through the plurality of display areas 72 and continuously adjust breathing to lower blood pressure. Therefore, the user can not only know the changes of various physiological data according to the said real-time display charts 721, but also know whether corresponding one of the physiological data reaches a high or low standard value according to said high level indicator lights 722 and said low level indicator lights 723 so as to change their breathing behavior to relieve physiological and psychological stress. Moreover, the guided training video guides the user to stretch their neck, which stimulates baroreflex to lower corresponding blood pressure and increase the pulse transit time data. The user can know whether the corresponding blood pressure data is decreased and then regulate their blood pressure accordingly. Therefore, by breathing and neck stretching guided in the guided training video, the blood pressure of the user can be lowered and the physiological and psychological stress of the user can be relieved.

The present invention further provides an experiment with three men of a nervous disposition and blood pressure greater than 140 mmHg. The control unit 8 performs the sound wave-induced brain stimulation during the experiment, the predetermined period of time is 30 min, the binaural beats with frequency following response are gradually decreased from 40 Hz to 3 Hz, and the guiding voice guides the user to gradually reduce the respiratory rate from 20 breaths per min to 10 breaths per min. In the experimental results, an anxiety score is improved by 26% and an depression score is decreased by 32% according to questionnaire data of the three men; cortisol levels are decreased by 20% based on blood measurements; the brainwave changes sequentially from Gamma, Beta, alpha, theta and delta according to the brainwave signal; the parasympathetic nerve of the user is improved and the sympathetic nerve of the user is reduced according to the heart rate variability data; and the heartbeat is decreased by 5% and the systolic blood pressure is decreased by 7% according to the heartbeat signal and the blood pressure signal. Therefore, the self-training system for lowering blood pressure and relieving physiological and psychological stress has the effect on lowering the user's blood pressure and relieving physiological and psychological stress.

In summary, with the breathing sensor 212, the heartbeat sensor 213, the blood oxygen sensor 222, the finger pulse sensor 223, the blood pressure measurement unit 23, the plurality of electrode agents 41, the four acupoint agents 51, the pair of headphones 61 and the display unit 7, the user can receive stimulations and guidance to lower blood pressure and relieve physiological and psychological stress.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A self-training system for lowering blood pressure and relieving physiological and psychological stress, configured to be used by a user, including:
   a respiration measurement unit, including a breathing strap configured to be wrapped around a chest of the user, a breathing sensor disposed on the breathing strap and configured to measure a state of chest expansion of the user and output a breathing signal accordingly, and a heartbeat sensor disposed on the breathing strap and configured to measure a heartbeat status of the user and output a heartbeat signal accordingly;
   a blood oxygen measurement unit, including a finger cot configured to be worn on a finger of the user, a blood oxygen sensor disposed on the finger cot and configured to measure a blood oxygen saturation level of the user and output a blood oxygen saturation signal accordingly, and a finger pulse sensor disposed on the finger cot and configured to measure a change status of a blood vessel volume of the user and output a finger pulse signal accordingly;
   a blood pressure measurement unit, configured to be worn by the user for measuring a blood pressure status of the user and outputting a blood pressure signal accordingly;
   a head frame unit, corresponding to a head shape of the user, including two ear portions corresponding to ears of the user and a top-side portion connected between the two ear portions and configured to be disposed across a top of a head of the user upwardly;
   an electrode unit, including a plurality of electrode agents disposed on the head frame unit, two of the plurality of electrode agents disposed on the top-side portion and respectively corresponding to a C3 position and a C4 position of an international 10-20 system for electroencephalograph (EEG) electrode placement to measure a brainwave status of the user and output a brainwave signal accordingly;
   an audio stimulation unit, including a pair of headphones disposed on the two ear portions;
   a display unit, disposed on the head frame unit and displaying a virtual image to the user, the display unit being switchable between a normal mode and a guided training mode, in the normal mode, the virtual image including a plurality of display areas, one of the plurality of display areas corresponding to a pulse transit time data, one of the plurality of display areas corresponding to the brainwave signal, one of the plurality of display areas corresponding to a heart rate variability data, one of the plurality of display areas corresponding to the breathing signal, one of the plurality of display areas corresponding to a heart rate data, one of the plurality of display areas corresponding to a blood pressure data, one of the plurality of display areas corresponding to the blood oxygen saturation signal, each of the plurality of display areas having a real-time display chart, a high level indicator light and a low level indicator light, in the guided training mode, the virtual image displaying a guided training video; and
   a control unit, communicatively connected with the breathing sensor, the heartbeat sensor, the blood oxygen sensor, the finger pulse sensor, the blood pressure measurement unit, the plurality of electrode agents, the pair of headphones and the display unit; wherein the control unit calculates the pulse transit time data corresponding to a pulse transit time according to the heartbeat signal and the finger pulse signal, calculates the heart rate variability data corresponding to a heart rate variability according to the heartbeat signal, calculates the heart rate data corresponding to a heart rate according to the heartbeat signal, and calculates the blood pressure data corresponding to a blood pressure according to the blood pressure signal; when the display unit is in the normal mode, the control unit controls the plurality of display areas to display said real-time display charts according to said signals and said data; when one of the said signals and the said data is greater than a highest predetermined value, the control unit controls corresponding one of said high level indicator lights to light up; when one of the said signals and the said data is lower than a lowest predetermined value, the control unit controls corresponding one of said low level indicator lights to light up; when the display unit is in the guided training mode, the control unit controls the display unit to display the guided training video and controls the pair of headphones to display a guiding voice corresponding to the guided training video; a sound wave-induced brain stimulation is performable by the control unit; when the control unit performs a sound wave-induced brain stimulation, the control unit controls the pair of headphones to display binaural beats with frequency following response and stop after a predetermined period of time, the binaural beats with frequency following response have a major carry sound and a loading sound having a frequency difference of binaural beats therebetween, the pair of headphones display the major carry sound and the loading sound simultaneously, and in the predetermined period of time, the binaural beats with frequency following response are gradually decreased from a higher frequency difference of binaural beats to a lower frequency difference of binaural beats, the higher frequency difference of binaural beats is between 45 Hz and 35 Hz, and the lower frequency difference of binaural beats is between 5 Hz and 1 Hz.

2. The self-training system for lowering blood pressure and relieving physiological and psychological stress of claim 1, wherein when the control unit controls the pair of headphones to display the guiding voice corresponding to the guided training video, the guiding voice is configured to guide the user to gradually reduce a respiratory rate from 22~18 breaths per minute to 12~8 breaths per minute.

3. The self-training system for lowering blood pressure and relieving physiological and psychological stress of claim 1, further including an acupoint stimulation unit, wherein the head frame unit further includes a rear-side portion connected between the two ear portions and configured to be disposed across a back of the head of the user and a front-side portion connected between the two ear portions and configured to be disposed across a forehead of the user, the top-side portion has a top area located in a center between the two ear portions, the acupoint stimulation unit includes four acupoint agents disposed on the head frame unit and electrically connected with the control unit, the four acupoint agents are controllable by the control unit to output physical stimulations, the four acupoint agents are configured to output the physical stimulations of laser lights to acupoints on the head of the user, one of the four acupoint agents is configured to be selectively disposed on a center of the top area and correspond to a baihui acupoint of the user, two of the four acupoint agents are configured to be selectively disposed on the rear-side portion and located at positions that 7 times of a finger cun backward from the center of the top area and 2.25 times of the finger cun spaced apart from the two ear portions and correspond respectively to two fengchi acupoints of the user, one of the four acupoint agents is configured to be selectively disposed on the front-side portion and located at a position that 10 times of the finger cun forward from the top area and correspond to a yintang acupoint of the user, the finger cun is substantially 2.3 cm, and wavelengths of the laser lights of the four acupoint agents are between 500 nm and 900 nm.

4. The self-training system for lowering blood pressure and relieving physiological and psychological stress of claim 1, wherein the head frame unit further includes a front-side portion connected between the two ear portions and configured to be disposed across a forehead of the user and a connecting portion extending forwardly from the top-side portion, the top-side portion includes a top area located in a center between the two ear portions and a left area and a right area respectively connected between one of the two ear portions and the top area, the connecting portion extends forwardly from the left area, two of the plurality of electrode agents are respectively disposed on the left area and the right area and respectively correspond to the C3 position and the C4 position on the international 10-20 system for EEG electrode placement, two of the plurality of electrode agents are respectively disposed on the connecting portion and the front-side portion and respectively correspond to a F3 position and a SO position in the international 10-20 system for EEG electrode placement, said electrode agent corresponding to the C3 position is configured to measure the brainwave status of the user, and said electrode agents corresponding to the F3 position and the SO position are controlled by the control unit to output the physical stimulations including one of a current for transcranial electrical stimulation and an electromagnetic pulse for transcranial magnetic stimulation to the head of the user.

5. The self-training system for lowering blood pressure and relieving physiological and psychological stress of claim 4, wherein when the plurality of electrode agents are of a type outputting direct current, a current intensity of the current is between 1 mA and 2 mA, a current density of the current is between 0.03 mA/cm$^2$ and 0.09 mA/cm$^2$; and when the plurality of electrode agents are of a type outputting the electromagnetic pulse, an electromagnetic frequency of the electromagnetic pulses is 1 Hz.

6. The self-training system for lowering blood pressure and relieving physiological and psychological stress of claim 5, wherein the electromagnetic pulse is generated by a Helmholtz coil and between the C3 position and the SO position and between the F3 position and the SO position.

* * * * *